: (12) United States Patent
Kishibe et al.

(10) Patent No.: US 6,324,038 B1
(45) Date of Patent: Nov. 27, 2001

(54) CURRENT CONTROL APPARATUS WITH OVERCURRENT PROTECTIVE FUNCTION FOR A MOTOR

(75) Inventors: Taro Kishibe, Nishinomiya; Yasufumi Ikkai, Kobe, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/512,076

(22) Filed: Feb. 24, 2000

(30) Foreign Application Priority Data

Mar. 30, 1999 (JP) .................................................. 11-088756

(51) Int. Cl.$^7$ ...................................................... H02H 5/04
(52) U.S. Cl. ............................... 361/31; 361/87; 361/93.9
(58) Field of Search ........................... 361/87, 93.1, 93.2, 361/93.4, 93.6, 93.9, 23, 31; 318/719, 445, 447, 139

(56) References Cited

U.S. PATENT DOCUMENTS

| | | | |
|---|---|---|---|
| 3,803,454 | * 4/1974 | Higuchi | 361/31 |
| 4,090,114 | * 5/1978 | Thompson | 318/139 |
| 4,423,362 | * 12/1983 | Konrad et al. | 318/139 |
| 4,514,665 | * 4/1985 | Melocik et al. | 318/139 |
| 5,461,531 | * 10/1995 | Tuchiya et al. | 361/28 |
| 5,592,355 | 1/1997 | Ikkai et al. | 361/94 |
| 5,757,161 | 5/1998 | Ikkai et al. | 318/719 |

* cited by examiner

Primary Examiner—Michael J. Sherry
(74) Attorney, Agent, or Firm—Greenblum & Bernstein, P.L.C.

(57) ABSTRACT

In a motor control apparatus, a current control section (1) controls the motor current by judging whether the current value detected by the current detecting unit (4, 7, 14) is of an overcurrent level exceeding an admissible value (Tmax) or a normal level which is equal to or smaller than the admissible value. When the current value detected by the current detecting unit is of an overcurrent level, the current control section restrains the current value to be supplied to the motor irrespective of the external motor torque or speed command, and when the current value detected by the current detecting unit becomes to be the normal level, the current value to be supplied to the motor is restored to an original non-restraint level.

22 Claims, 10 Drawing Sheets

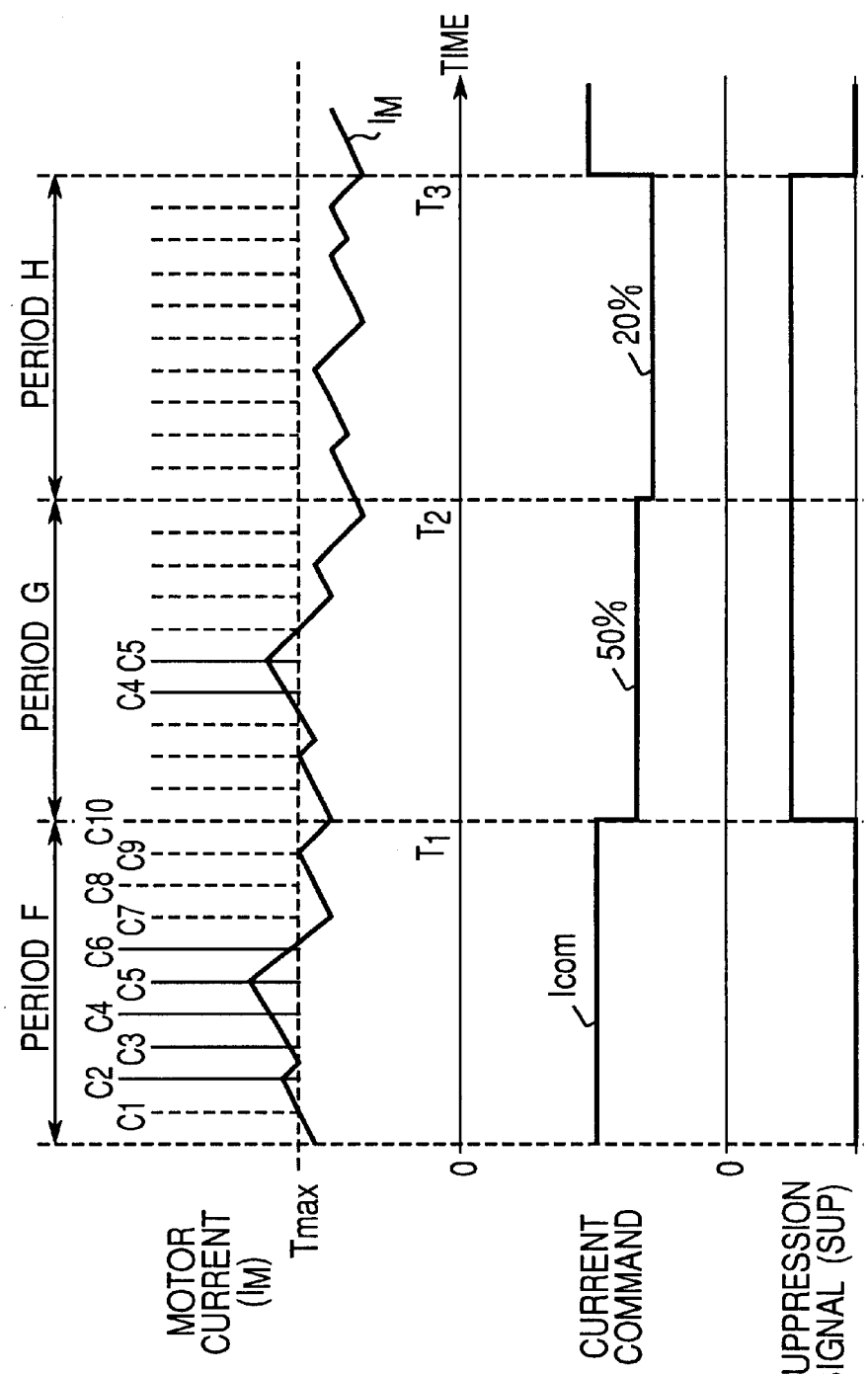

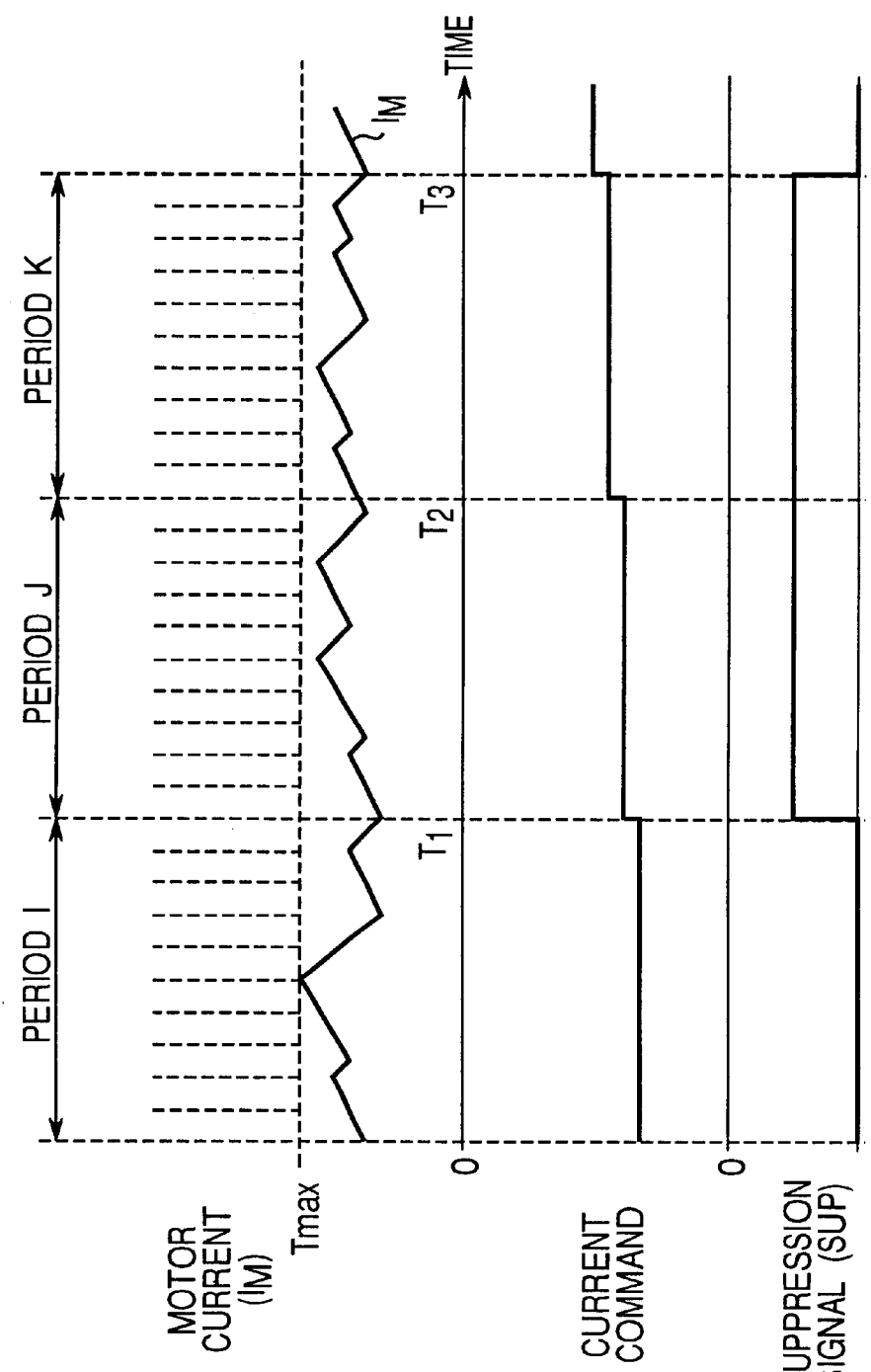

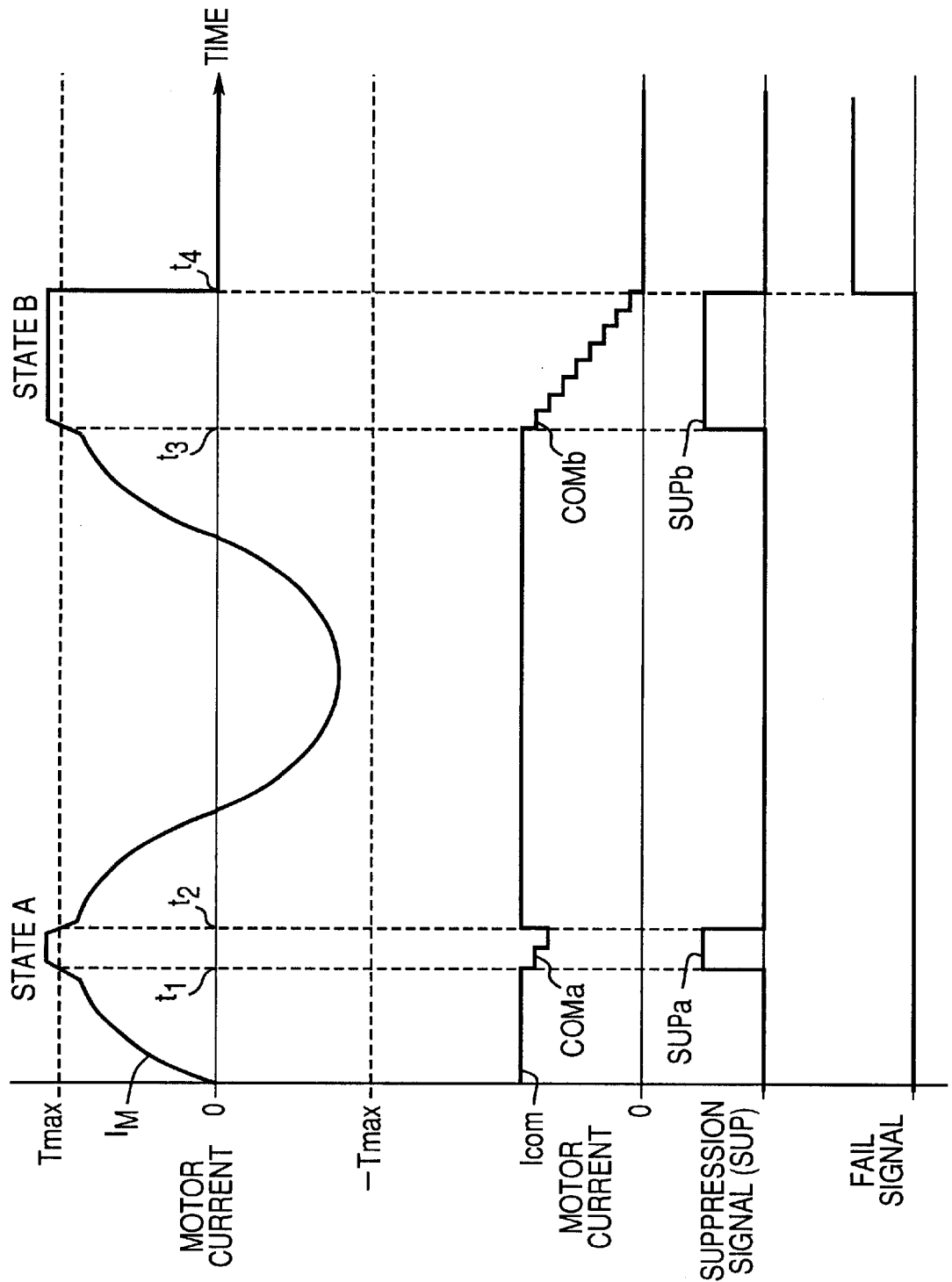

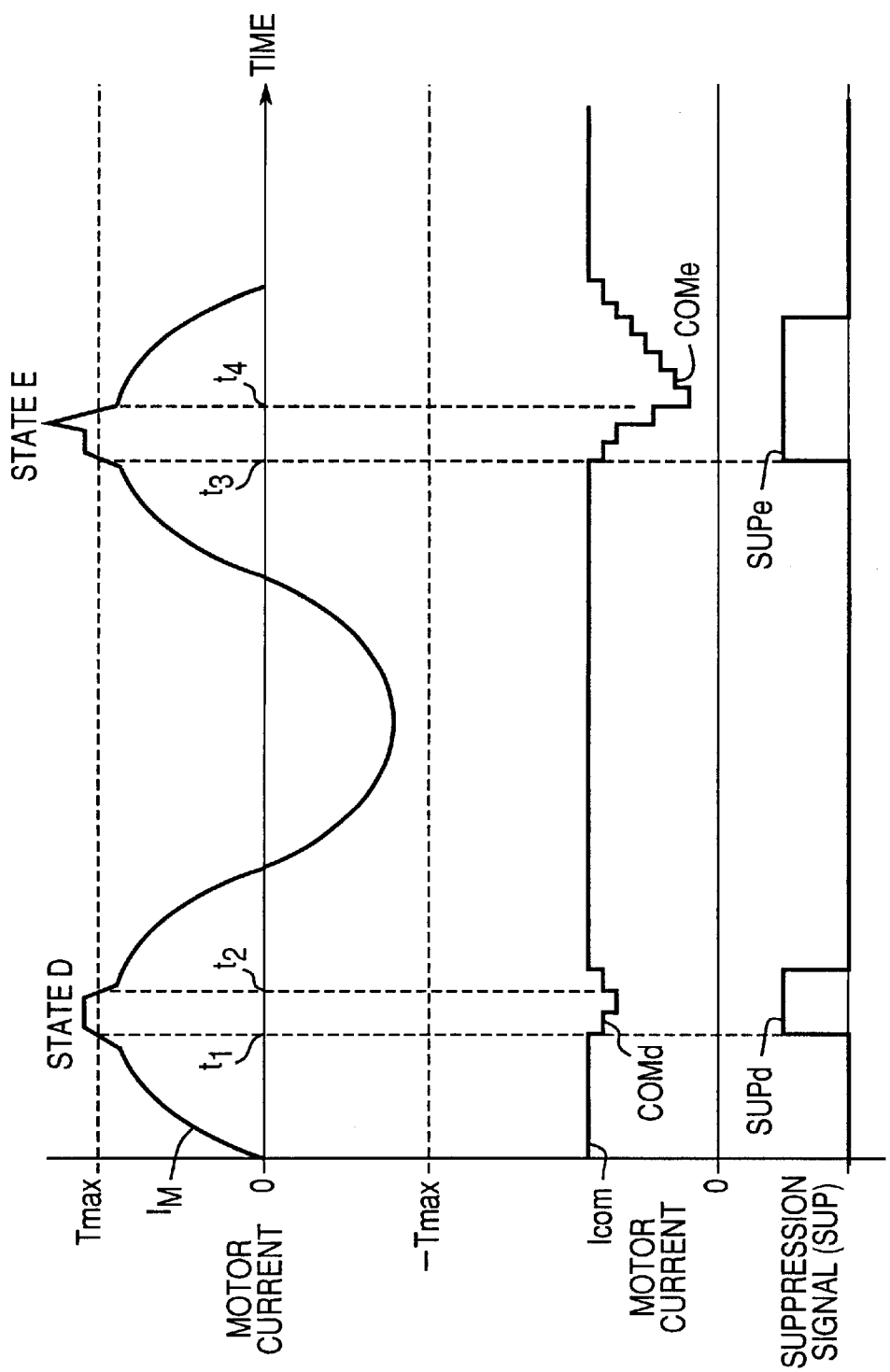

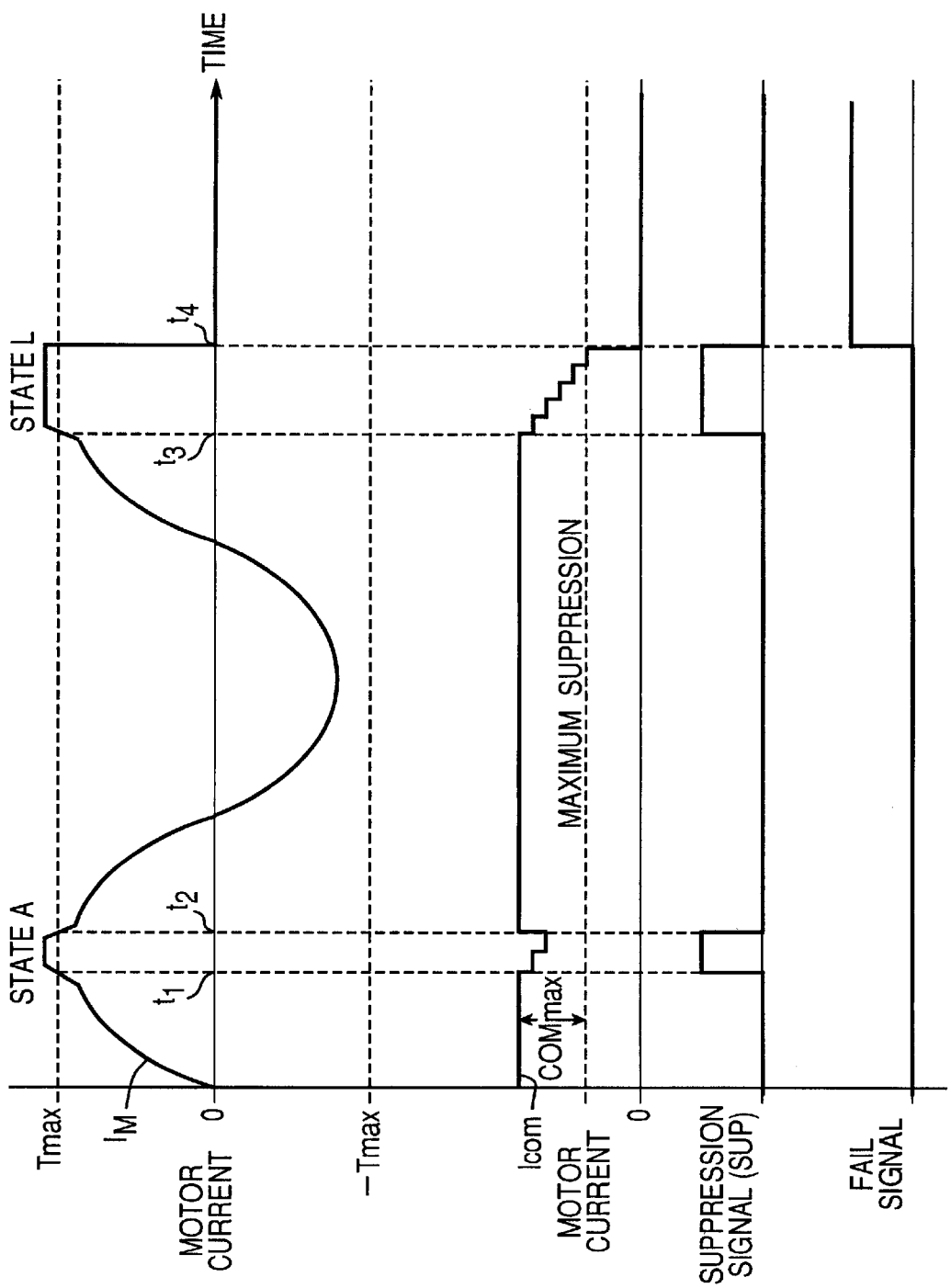

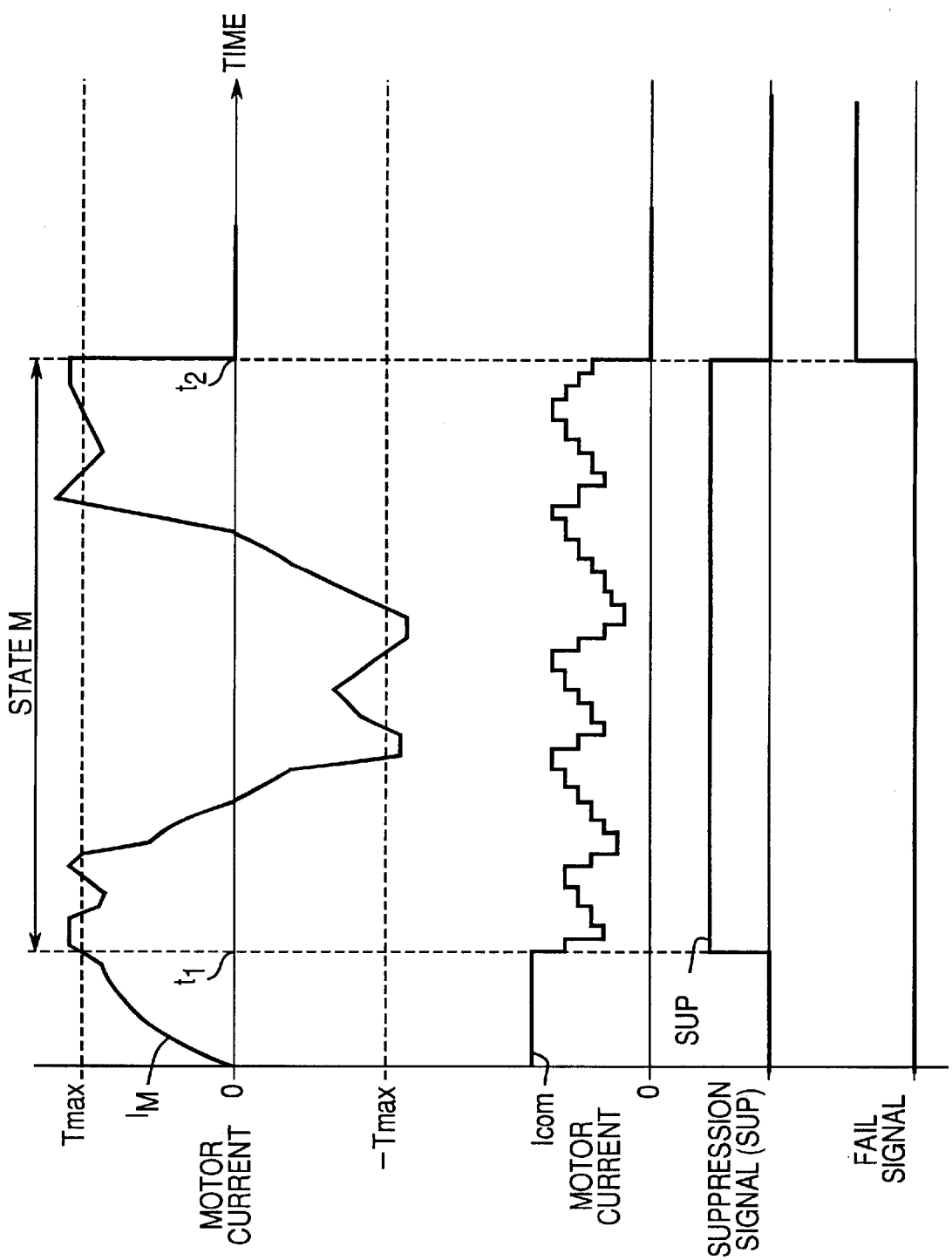

CURRENT CONTROL APPARATUS WITH OVERCURRENT PROTECTIVE FUNCTION FOR A MOTOR

BACKGROUND OF THE INVENTION

1. Field of the Invention

The present invention generally relates to a motor protecting apparatus, and in particular to a current supply control apparatus having an overcurrent protective function of protecting an electrically-powered motor and a drive control circuit therefor with suppression of overcurrent in an electric vehicle.

2. Description of the Prior Art

In recent years, engineers rapidly pursue development of electrically-powered motor vehicles, and particularly demand for electric cars including hybrid cars is rapidly increased for the purpose of environmental protection measures. Either a DC motor or an AC motor is used as a driving power unit of this type of electric vehicles. In particular, a synchronous motor using permanent magnet for a rotor of the motor is mainly developed for an electric car because such a synchronous motor exhibits high efficiency.

Conventionally, synchronous motors of this type are widely used in a factory automation field in industry, and they are also suited for use in a field of electric cars while the basic control methods of the synchronous motors of this type are essentially the same both in the factory automation field and the electric vehicle field.

In a conventional control method of a synchronous motor for use in a factory automation field, when an overcurrent of a drive power device for driving a power motor is detected, electric current supply to the motor is instantaneously cut off to control the overcurrent of the power device so that the current supply to the motor is completely and immediately cut off.

However, in the case of an electric car which is driven using an electrically-powered motor, if the motor is suddenly controlled in the same manner as in the factory automation, there may cause a danger that the electric car may suddenly and unexpectedly stop and a behind car may collide, and further when a front car suddenly stops, it is impossible to avoid a front danger. On the other hand, when an overcurrent is detected, failure to interrupt the current supply may result in serious damage to the motor power device such as a fire occurrence of a motor drive unit and the like control circuit in the electric car.

In order to avoid such a problem involved in the conventional electrically-powered motor vehicles, in the disclosure of U.S. Pat. No. 5,592,355, there is suggested a motor control circuit which provides for improved ON/OFF switch safety in an electric car operation by temporarily interrupting a motor power supply as a means of eliminating an overcurrent supply to the motor when an overcurrent is detected, and in the case where a period integrating the overcurrent detection time exceeds a predetermined time limit, the motor power supply is completely shut out.

In this construction, even when an overcurrent is detected, the current supply is not completely stopped but merely temporarily interrupted, and the current supply for motor drive is retrieved when the current supply is appropriately reduced by eliminating the overcurrent. In this construction, however, when the ON/OFF switch of electric current supply to the motor is frequently repeated, a variation in torque of the motor is increased, which is offensive to a driver and passengers.

SUMMARY OF THE INVENTION

The present invention has been developed to solve these problems and has an essential object to provide an improvement of a current control apparatus with an overcurrent protective function protecting a motor and a drive control circuit with suppression of overcurrent in an electric vehicle in which an overcurrent to a motor is detected to be appropriately suppressed to thereby secure protection of the drive control circuit for the motor and enhance safety of the vehicle.

In order to achieve the object mentioned above, the present invention provides a current control apparatus with an overcurrent protective function for a motor which comprises: a current detecting unit for detecting a current value to be supplied to the motor for driving the motor; a current control section for determining the current value to be supplied to the motor based on a motor rotational command fed from an external portion and controlling the current value to be supplied to the motor by judging whether the current value detected by the current detecting unit is of an overcurrent level exceeding a prescribed value or a normal level which is not greater than the prescribed value. In this construction, when the current value detected by the current detecting unit is of an overcurrent level, the current control section restrains the current value to be supplied to the motor irrespective of the external motor rotational command, and when the current value detected by the current detecting unit is of the normal level, the current value to be supplied to the motor is restored to an original non-restraint level.

By the arrangements as described above, according to the present invention, when the current flowing through the drive power device of the electric car exceeds the prescribed value, the current supply is restrained in this manner, and when the current is controlled to be equal to or lower than the prescribed value, the current supply state is restored to the normal operation state. Thus, it is possible to prevent each of the parts of the car from being damaged, and secure safety of the car against danger such as collision due to sudden control to stop. Moreover, a danger can be avoided even when overcurrent is generated, having a large tolerance to a noise which may be caused when detecting the current, eliminating sudden variation in motor torque.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIGS. 3A, 3B and 3C are operational charts of a current command unit shown in FIG. 2;

FIGS. 4A, 4B and 4C are operational charts of another example of a current command unit shown in FIG. 2;

FIGS. 5A, 5B, 5C and 5D are operational charts of a motor control apparatus according to a first example;

FIGS. 7A, 7B and 7C are operational charts of a motor control apparatus according to a third example;

FIGS. 8A, 8B, 8C and 8D are operational charts of a motor control unit according to a fourth example;

FIGS. 9A, 9B, 9C and 9D are operational charts of a motor control apparatus according to a fifth example.

DETAILED DESCRIPTION OF THE PREFERRED EMBODIMENTS

Figure 1:
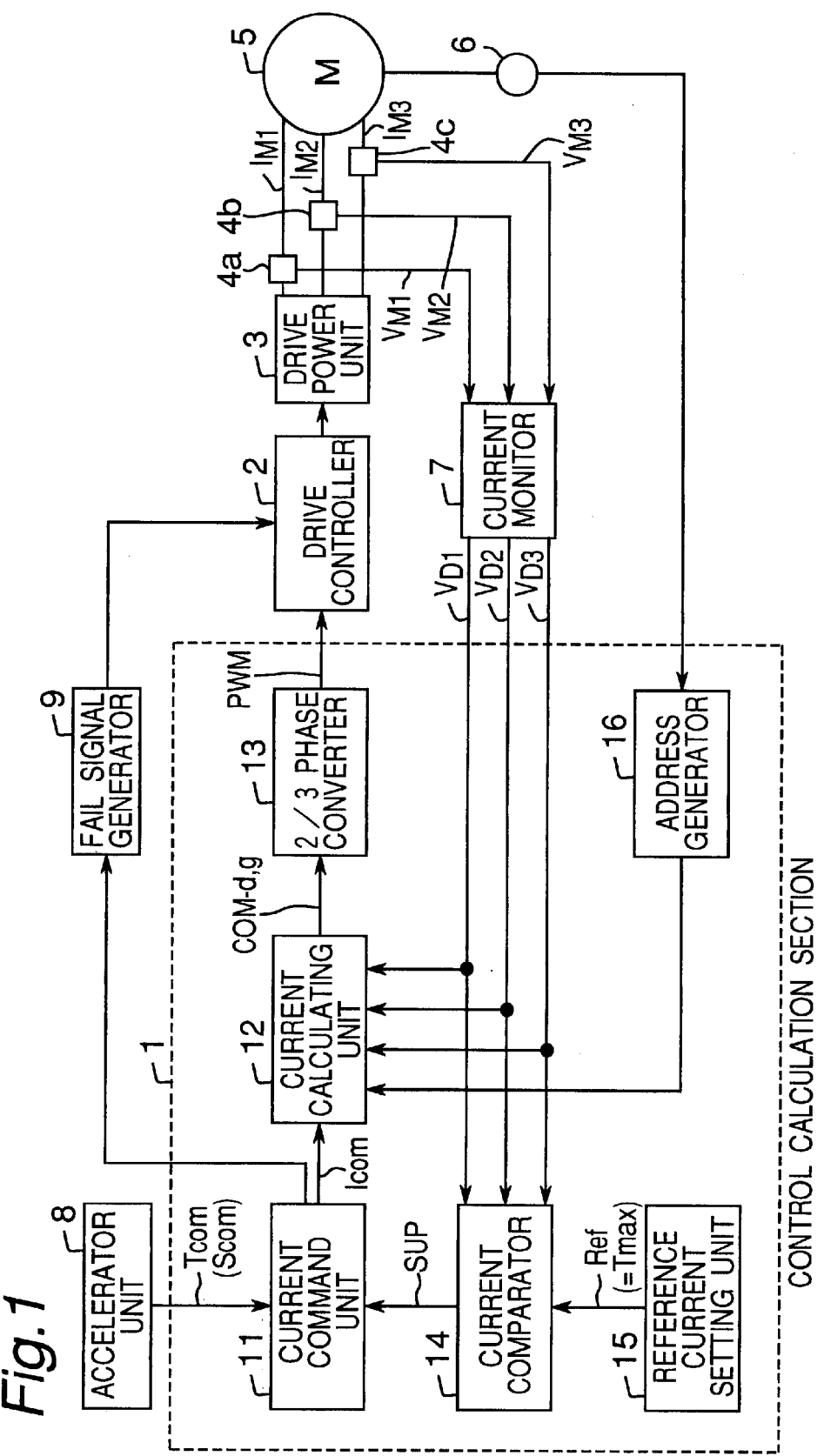
FIG. 1 is a block diagram of a motor control apparatus according to a first embodiment of the present invention.

Before the description proceeds, it is to be noted that, since the basic structures of the preferred embodiments are in common, like parts are designated by the same reference numerals throughout the accompanying drawings.

A first preferred embodiment of a motor control apparatus will be described below with reference to the accompanying drawings.

FIG. 1 shows a block construction of a motor control apparatus having an overcurrent protective function according to the first embodiment, where the motor control apparatus includes a control calculation section 1, a drive controller 2, a drive power unit 3, current detectors 4a, 4b, 4c (represented by 4), an electrically-powered motor 5, a rotary encoder 6, and a current monitoring unit 7. The control calculation section 1 further includes a current command unit 11, a current calculating unit 12, a 2-phase/3-phase converter 13 (referred to as "phase converter" hereinafter), a current comparator 14, a reference current setting unit 15 and an address generator 16.

In this construction, a synchronous motor with high efficiency is used as the electrically-powered motor 5 which serves as a driving power source of an electric car. In this embodiment, for example, an AC servo motor driven by a three-phase (U, V, W) current is used as the synchronous motor. The rotary encoder 6 having a pulse generator is connected to the motor 5 for outputting A-phase pulse, B-phase pulse and Z-phase pulse signals indicative of a rotor revolution position of the motor shaft. The A-phase pulse signal has a known pulse quantity and the B-phase pulse signal is shifted p/2 phases from the A-phase pulse signal, and these three-phase pulse signals are applied to the address generator 16.

The address generator 16 generates a digital address signal corresponding to the rotor revolution position of the motor 5 based on the three phase signals (A, B, Z) output from the encoder 6. In specific, the address generator 16 may be comprised of a counter reset by the Z-phase pulse and counts for the rotation position of the motor shaft using the A- and B-phase pulses. The digital address signal generated by the address generator 16 is applied to the current calculating unit 12 in the control calculation section 1.

The current detectors 4a, 4b and 4c detect values of motor currents $I_{M1}$, $I_{M2}$, and $I_{M3}$ (represented by $I_M$) actually flowing to the motor 5. Each of the current detectors 4a–4c may be comprised of a CT (current transformer) or the like device so that the current detectors 4a–4c convert the detected motor current $I_M$ into voltage signals $V_{M1}$, $V_{M2}$ and $V_{M3}$ (represented by $V_M$), respectively, corresponding to the motor current values. The resultant voltage signals output of the current detectors are applied to the current monitoring unit 7. The current monitoring unit 7 is comprised of an A/D converter, and these current detectors 4 together with the current monitoring unit 7 serve as current detecting means. If the current detectors 4a–4c can detect two phases, remaining one phase can be obtained by inverting a sign (+/−) of the sum of the detected two phases based on the equation: U-phase+V-phase+W-phase=0. In this case, the number of the current detectors may be two.

The A/D converter of the current monitoring unit 7 converts the voltage signals $V_M$ output from the current detectors 4 such that the voltage signals can be processed by a CPU or microcomputer, namely, the A/D converter converts analogue voltage signals $V_{M1}$, $V_{M2}$ and $V_{M3}$ to digital voltage values $V_{D1}$, $V_{D2}$ and $V_{D3}$ (represented by $V_D$) which are equivalent to the motor currents $I_M$. The resultant digital voltage signals $V_D$ output of the current monitoring unit 7 are applied in common to the current calculating unit 12 and to the current comparator 14 included in the control calculation section 1.

The reference current setting unit 15 sets a reference value (Tmax) equivalent to a maximum admissible current of e.g. ±100A of the motor current actually flowing to the motor. The maximum admissible current is usually set to 90 to 95% of a maximum current of the drive power device. The current value may be set to a smaller value (e.g., 70%) in some cases in view of heat generation protection. The current comparator 14 compares the current reference value set by the reference current setting unit 15 and an output value of the current monitoring unit 7 indicative of the motor current value. As the result of the comparison, when the motor current value exceeds the admissible current value Tmax (or less than −Tmax), the current comparator 14 generates a current suppression signal (SUP). Thus, the current comparator 14 outputs the result of the comparison to be applied to the current command unit 11.

An accelerator unit 8 outputs a torque command (Tcom) or a speed command (Scom) based on an accelerator pedal stepping angle, a brake pedal stepping angle, a gearshift position, a speed of the car and the like. The torque command or speed command output of the accelerator unit 8 is applied to the current command unit 11. The current command unit 11 outputs a current command (Icom) for use in controlling the motor drive based on the torque command or the speed command output from the accelerator unit 8. The construction of the current command unit 11 is described later with reference to FIG. 2.

The current calculating unit 12 including a CPU receives the current command Icom output of the current command unit 11 and calculates a command value of d-axis current (COM-d) and q-axis current (COM-q) based on the current command value Icom, the output value (Vd) of the current monitoring unit 7 equivalent to the motor current, and based on the digital address value output of the address generator 16. In general, the current calculating unit 12 calculates the d-axis current and the q-axis current actually flowing to the motor based on the outputs of the current monitoring unit 7 and the address generator 16, and then obtains a difference between the calculated result of the d-axis and q-axis currents and the current command value applied from the current command unit 11. The current calculating unit 12 includes a programmed interruption control unit (not shown) and the obtained difference is then subjected to a control processing such as programmed interruption (PI) control, and the resultant controlled value is generated as the output of the current calculating unit 12, which is then applied to the phase converter 13.

The phase converter 13 converts the command value of the d-axis and q-axis current applied from the current calculating unit 12 in a manner from 2-phase to 3-phase signals, and generates a pulse width modulating (PWM, hereinafter) command to each of the U, V and W phases.

The drive controller 2 comprised of such as a PWM control circuit is operatively connected between the control calculation section 1 and the drive power unit 3 and amplifies the PWM command output from the phase converter 13 to generate an electric power for driving the drive power unit 3. The drive controller 2 may be controlled under ON/OFF control by the current command unit 11. The drive power unit 3 is composed of a power device such as a PWM inverter, PWM inverter drive circuit including, for example, an insulated gate bipolar transistor (IGBT) and MOSFET, and supplies the motor drive current to the motor 5 via the current detectors 4a–4c.

In this arrangement, a fail signal generator 9 may be provided, and when the current command is set to zero, it is judged that the motor or motor control circuit is in abnormal condition, and fail signal may be generated by the fail signal generator 9 to interrupt the current supply. At that time, the current command is not restored until the motor control system is restarted.

Figure 2:
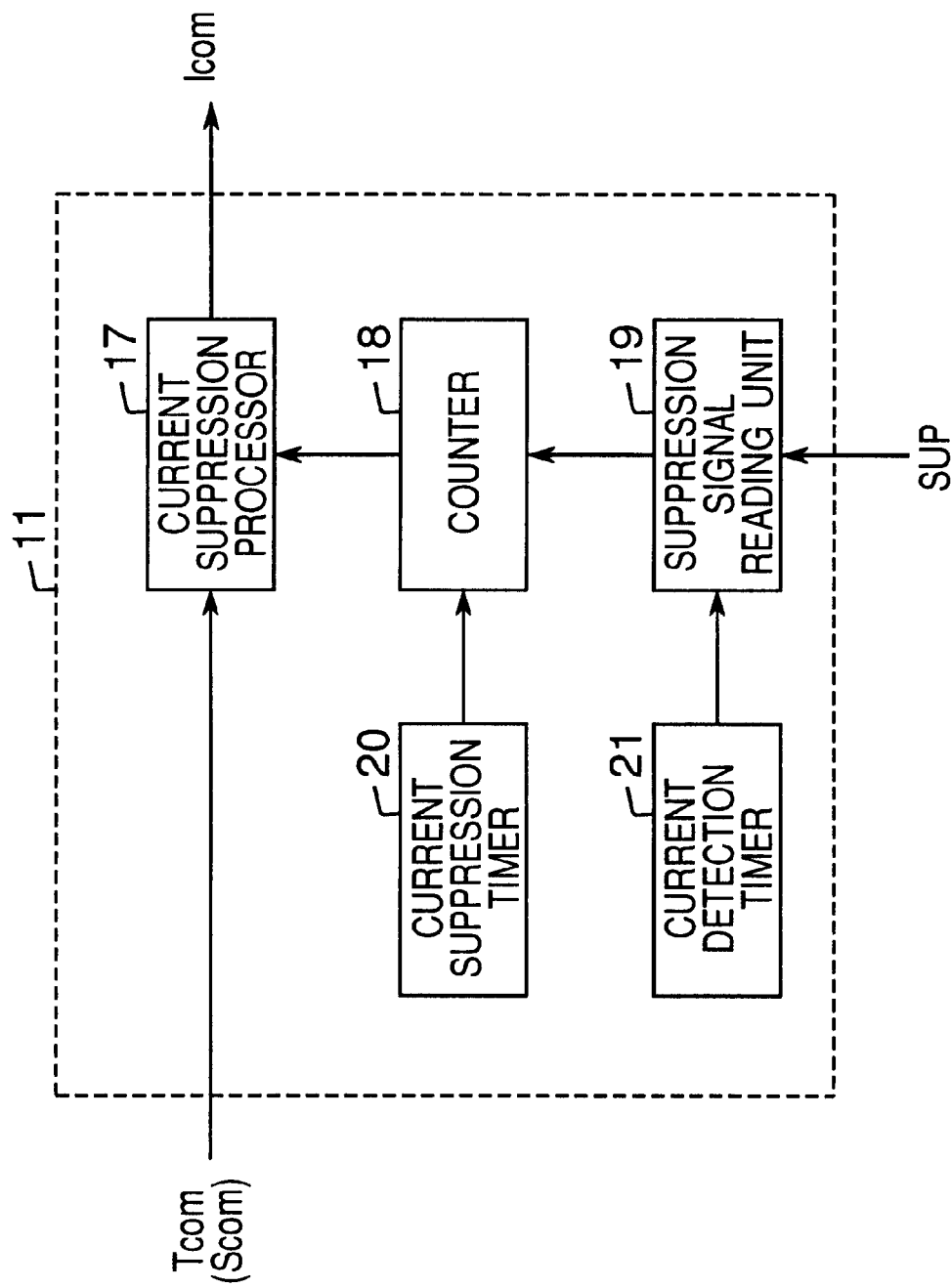
FIG. 2 is a block diagram of a current command unit for the motor control apparatus shown in FIG. 1.

FIG. 2 shows details of a block construction of the current command unit 11 included in the control calculation section 1 of the motor control apparatus, where reference numeral 19 represents a suppression signal reading unit for receiving a current comparison result (SUP) applied from the current comparator 14. When the motor current value exceeds the admissible current value, i.e., reference value (Tmax) set by the reference current setting unit 15, the suppression signal reading unit 19 receives, for example, a "L" signal of binary or multi-value signal as the suppression instruction signal SUP fed from the current comparator 14.

Reference numeral 21 represents a current detection timer for generating a timing signal indicating a cycle of operating the suppression signal reading unit 19. The timing signal generated by the current detection timer 21 may also indicate a cycle of operating the current detection units. When the motor current exceeds the admissible current, with the timing signal generated by the current detection timer 21, the suppression signal reading unit 19 generates the "L" signal of the current comparison result as the suppression instruction (SUP) every timing cycle generated by the current detection timer 21. For example, a PWM cycle is used as the timing cycle of the current detection timer 21. The PWM cycle is a cycle for turning the drive power device ON and OFF, and the PWM cycle depends on a carrier frequency utilizing a triangular wave. A carrier frequency of 8 to 15 kHz is commonly used and the PWM cycle is represented by an inverse of the carrier frequency.

Reference numeral 18 represents a counter which receives the output signal of the current signal reading unit 19 every cycle of the timing signal generated by the current detection timer 21 and counts up when receiving the "L" signal indicative of suppression instruction SUP.

Reference numeral 20 denotes a current suppression timer for generating a timing signal indicative of a cycle of outputting the counted number of the counter 18. The cycle of the timing signal generated by the current suppression timer 20 is set equal to or greater than the cycle of the timing signal generated by the current detection timer 21. For example, in the case where the cycle of the current detection timer 21 is 100 μs, it is preferable that the cycle generated by the current suppression timer 20 is about 1 ms 10 ms.

Reference numeral 17 represents a current suppression processor unit for determining the current command value based on the torque command (Tcom) or speed command (Scom) applied from the accelerator unit 8 and the counted value output of the counter 18 to thereby generate the current command (Icom) to be applied to the current calculating unit 12. In more detail, the suppression amount of the current command value is determined based on the counted value output of the counter 18 to thereby restrain the motor current which has been supplied based on the torque command (Tcom) or speed command (Scom) applied from the accelerator unit 8.

The following describes the operation of the current command unit 11 shown in FIG. 2 with reference to operational timing charts of FIGS. 3A to 3C. In the case where a cycle of the current detection timer 21 is set to 100 μs and a cycle of the current suppression timer 20 is set to 1 ms, the maximum count number of the counter 18 is 10. The suppression amount of the current command is varied in accordance with the count numbers 0 to 10 (represented by $c_1$ to $c_{10}$ in one period T1). For example, in a first period F from time 0 to T1 of the current suppression timer 20 including ten cycles $c_1$ to $c_{10}$ of the current detection timer 21 as shown in FIG. 3A, the count number of the overcurrent detection timing is five, i.e., at current detection timings $c_2$, $c_3$, $c_4$, $c_5$ and $c_6$ in this example, and therefore, as shown in FIG. 3B, the current command suppression amount is set to e.g. 50% with receipt of the suppression instruction signal SUP shown in FIG. 3C for the subsequent period G from time T1 to T2.

In the second period G, the count number of the overcurrent detection timing is two, i.e., at current detection timings $c_4$ and $c_5$ in the figure, and therefore the current command suppression amount is set to e.g. 20% with the suppression signal SUP for the subsequent period H from time T2 to T3. In the third period H, the count number of the overcurrent detection is zero, and therefore the current command value is returned to the original value at time T3 for the subsequent operation.

By this current control operation, when the current flowing through the power device or motor of the electric car exceeds the prescribed value, the motor current is restrained in accordance with the counted number of the overcurrent detection timing in this manner, and when the current is suppressed to be equal to or lower than the prescribed value, the current command value is returned to the normal operation state. Thus, it is possible to prevent each of the motor drive parts from being damaged, and to secure safety of the car against danger such as collision due to sudden control stop. Moreover, a danger can be avoided even when overcurrent is generated, maintaining a large tolerance to a noise which may be caused when detecting the current flowing through the drive power device, eliminating sudden variation in motor torque.

FIGS. 4A, 4B and 4C show operational charts of a modified example of the operation of the current command unit 11 shown in FIG. 2. In this example, whereas the current command is restored to the original state immediately after the period H of zero count state as shown in FIG. 3B, this example is arranged such that, when a count value counted by the counter 18 becomes zero in the three periods I (T1), J (T1 to T2) and K (T2 t T3) as shown in FIG. 4A, the current command value is gradually returned to the original state as shown in FIG. 4B. By gradually returning the current command in this manner, it is possible to further reduce a variation in motor torque.

In this arrangement, the current returning amount may be set to a value equal to or different from the current restraining amount in ratio. For example, if the current returning amount is set greater than the current restraining amount in ratio such as 1.5, 2 times and the like, it is possible to cancel the current restraint quickly, and to output a maximum torque. If the current returning amount is set smaller than the current restraining amount in ratio such as 0.5 times and the like, it is possible to strengthen the protection of the power device.

EXAMPLE 1

Next, the operation of the motor control apparatus having the above-described structure shown in FIG. 1 will be explained with reference to FIGS. 5A to 5D. In FIG. 5A, a state A indicates a first overcurrent state in a duration from time t1 to time t2, and when the motor current value $I_M$ exceeds the admissible current value (Tmax) at time t1, the current comparator 14 generates a first current suppression signal SUPa shown in FIG. 5C. Based on the first current suppression signal (SUPa), the current command unit 11 restrains the current command Icom as represented by COMa shown in FIG. 5B, to restrain the motor current value.

After this treatment, when the motor current becomes equal to or lower than the admissible current value by restraining the current command, the current suppression instruction is canceled and the current supply to the motor is restored to a normal operation state (from time t2 to time t3 shown in FIG. 5A).

Then, in the next overcurrent state B in a duration from time t3 to time t4, when the motor current again exceeds the admissible current value, a second current suppression signal SUPb shown in FIG. 5C is again generated by the current comparator 14, and the current command unit 11 further restrains the current command Icom as represented by COMb shown in FIG. 5B, to further lower the motor current value so long as the overcurrent is detected. Even in this treatment, if the motor current keeps exceeding the admissible current value, the current command Icom is kept restrained in a stepwise manner, and when the current command is finally equal to zero, the current supply to the motor is stopped at time t4. In other words, only in the case where the overcurrent state remains long until the current command is kept restrained to be zero, it is judged that the operation state is abnormal and the current supply to the motor is stopped. In this manner, the conventional problem due to frequent repetition of the ON/OFF switch of current supply to the motor can be effectively avoided with suppression of a variation in torque of the motor.

In this arrangement, when the current command Icom is restrained to be set to zero, it is judged that the motor or motor control circuit is abnormal, and the fail signal may be generated by the fail signal generator 9 as shown in FIG. 5D.

As described above, when the current flowing through the drive power unit of the electric car exceeds the prescribed value, the current supply to the motor is restrained in this manner, and when the current is controlled to be equal to or lower than the prescribed value, the current supply state is restored to the normal operation state. Thus, it is possible to prevent each of the motor drive parts of the car from being damaged and to secure safety of the car against danger such as collision due to sudden control to stop. Moreover, a danger can be avoided even when overcurrent is generated, maintaining a large tolerance to a noise which is caused when detecting the motor current, with eliminating sudden variation in motor torque.

EXAMPLE 2

FIGS. 6A to 6D show operational charts of a motor control apparatus according to a second example. In this example, the specific feature distinct from the first example shown in FIGS. 5A–5D resides in the fact that, in the second overcurrent state C, the overcurrent value of the motor current exceeding the admissible current value is not constant but varied from C1 to C2 in a multi-stepped manner, for example, in a relation of C1<C2 as shown in FIG. 5A. Based on this relation, the current suppression amount of the current command Icom is varied in accordance with the current excess steps. For example, when the relation C2=2·C1 of the excess current steps is detected by the current detection means (4, 7, 14), a current command is set to 0.95×I* when in the state of C1, and 0.9×I* when in the state of C2, where I* is an original current command amount determined based on only the torque or speed command applied from the accelerator unit without application of the suppression signal SUP from the current comparator 14. In this example, the current suppression amount of the current command Icom in a unit time is increased in accordance with the overcurrent value of the motor current exceeding the admissible current value.

This variation measure of the current suppression amount can be realized by varying the current command suppression rate in accordance with the current excess steps together with counting the overcurrent detection number. For example, when an overcurrent value is 3A exceeding a reference current value of 100A, the current command suppression rate is set to 3%. Alternatively, when a square rate is employed, the suppression rate may be set to 9% in the above example.

Figures 6A, 6B, 6C, 6D:
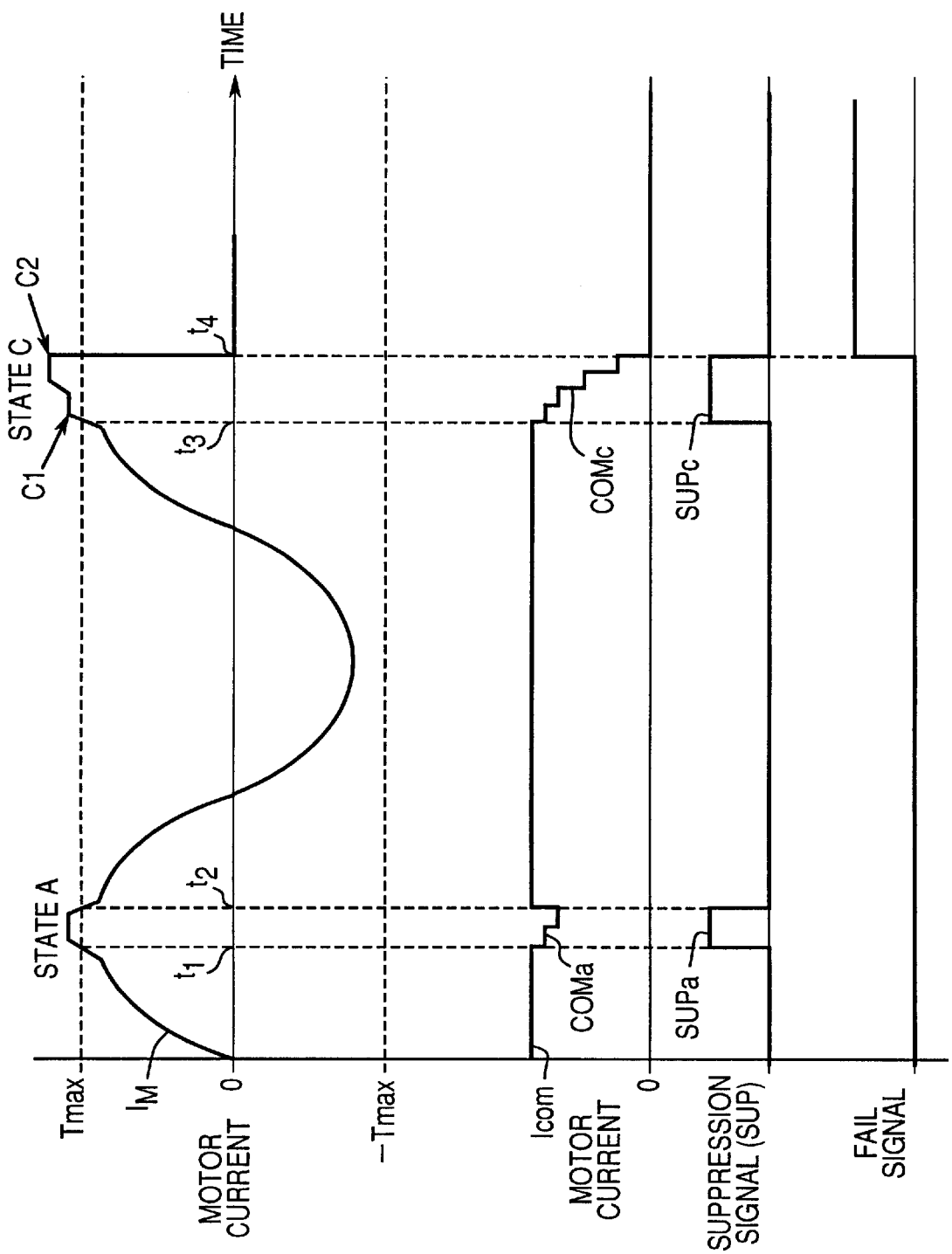
FIGS. 6A, 6B, 6C and 6D are operational charts of a motor control apparatus according to a second example.

In this arrangement, when the current command is set to zero (at time t4), it is judged that the motor or motor control circuit is abnormal, and a fail signal may be generated by the fail signal generator 9 as shown in FIG. 6D.

When the current flowing through the drive power unit of the electric car exceeds the prescribed value, the current supply is restrained in this manner, and when the current becomes equal to or lower than the prescribed value, the operation state is returned to the normal operation (State A), and it is possible to effectively prevent each of the motor drive parts from being damaged. Moreover, by increasing a current restraining weight of the current restraining amount and more reducing the current command value as the overcurrent value of the motor current is increased (as shown in State C), the drive power device can be protected more effectively.

EXAMPLE 3

FIGS. 7A to 7C represent operational charts of a motor control apparatus according to a third example. The specific feature of this example resides in the fact that, in the first and second overcurrent states D and E, when the motor current is restrained to be equal to or lower than the admissible current value by suppressing the current command indicated by COMd and COMe, the current command value Icom is so controlled as to be gradually returned to the original non-restraint value at times t2 and t4 and thereafter as shown in FIG. 7B. This technology may be combined with the variation measure of the current suppression amount described in the second example shown in FIG. 6B. By gradually returning the current in this manner, it is possible to further reduce the variation in motor torque.

In this arrangement, the current returning amount may be set to a value different from the current restraining amount. For example, when the current returning amount is set greater than the current restraining amount, it is possible to cancel the current restraint quickly and to output a maximum torque. When the current returning amount is set smaller than the current restraining amount, it is possible to strengthen the protection of the drive power device.

EXAMPLE 4

FIGS. 8A to 8D show operational charts of a fourth example of the operation of the motor control apparatus. In this example, a maximum current restraining value COMmax is set in the current command value. In specific, the current is kept restrained in an overcurrent state L, and when the current command value becomes equal to or smaller than a maximum current restraining value COMmax at time t4, the current command value is set to zero at this time.

In this arrangement, when the current command is set to zero, it is judged that the motor or motor control circuit is abnormal, and fail signal may be generated by the fail signal generator 9 as shown in FIG. 8D. At that time, the current command is not restored until the motor control system is restarted.

By this arrangement, it is possible to prevent each of the parts from being damaged more effectively, and the drive power device can be protected more effectively.

EXAMPLE 5

FIGS. 9A to 9D show operational charts of a motor control operation according to a fifth example. In the case where the current command is restrained and returned repeatedly in a state M from time t1 to time t2 shown in FIGS. 9A and 9B, when the current command is kept restrained with the suppression signal SUP for a predetermined time period shown in FIG. 9C even after a fixed time period is elapsed in the state M, the current command value is set to zero at time t2.

In this arrangement, when the current command is set to zero, it is judged that the motor or motor control circuit is abnormal, and fail signal may be generated by the fail signal generator 9 as shown in FIG. 9D.

By this arrangement, it is possible to prevent each of the parts from being damaged more effectively, and the drive power device can be protected more effectively.

As shown in FIGS. 5D, 6D, 8D and 9D, when the current command is suppressed to be zero, it is judged that the motor or a control circuit is abnormal, and the fail signal is generated by the fail signal generator 9. At that time, the current command is not restored until the motor control system is restarted.

In this manner, each part is prevented from being damaged when overcurrent protection is operated, and the safety is secured against a danger such as collision due to sudden control stop, so that destroy of the power device and breaking out of a fire thereof can be effectively avoided.

In the present embodiment, although the current flowing through the power device of the drive power unit is detected for use as the detection current, the current flowing through the motor can be also used as the detection current. Also, in this arrangement, when the current flowing through the power device of the electric car exceeds the prescribed value, the current is restrained in the manner as described above, and when the current becomes equal to or lower than the prescribed value, the operation state is returned to the normal operation, obtaining similar effects of preventing each of the parts from being damaged, securing safety of the car against danger, and the like.

Second Embodiment

Figure 10:
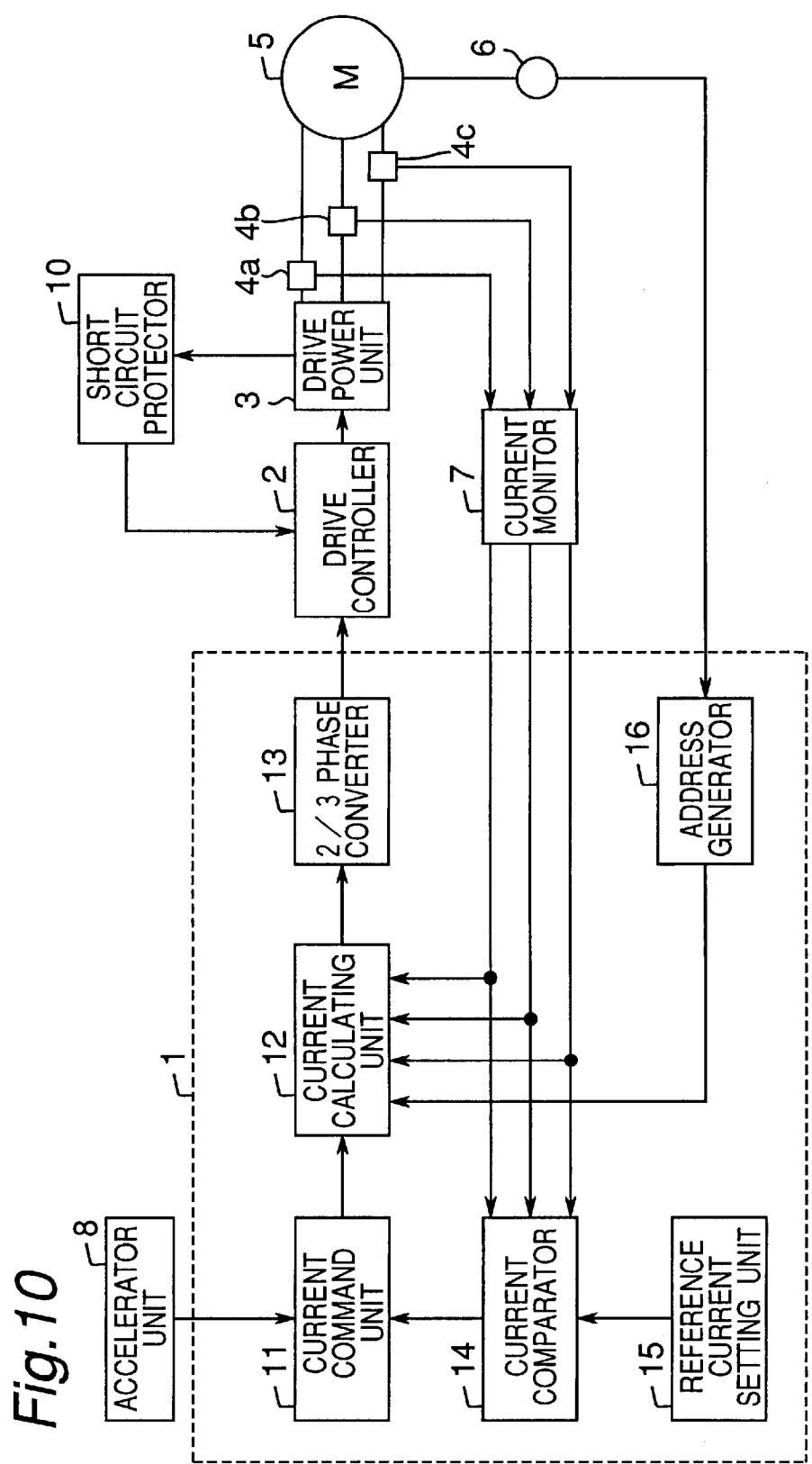
FIG. 10 is a block diagram of a motor control apparatus according to a second embodiment of the present invention.

FIG. 10 shows a block construction of a motor control apparatus according to a second embodiment of the present invention. A specific feature of this embodiment resides in the fact that a short circuit protecting unit is provided in the motor control apparatus for monitoring the current value supplied to the motor and protecting the power device from an abnormal current of a destructive level flowing therethrough, and the other constructions are similar to that of the first embodiment.

Reference numeral 10 represents a short circuit protector which receives a detection signal indicating the detection result of detecting the current flowing through the drive power unit 3. In the case where the detection signal indicates that the current flowing through the drive power unit is of a current value which may destroy the power device, the short circuit protector 10 generates a stop signal to be applied to the drive controller 2 for stopping the current supply of PWM to the drive power unit 3. Since the short circuit protector 10 is usually comprised of a hardware circuit, it is possible to execute the stopping process at high speed. Therefore, when a processing cycle of the motor control apparatus is set long, it is effective to prevent the power device from being destroyed.

With this arrangement, it is possible to prevent the power device from being destroyed by providing the short circuit protector, thereby avoiding an occurrence of a fire of the car due to destroy of the power device.

As described above, according to a first aspect of the present invention, a current control apparatus with an overcurrent protective function for a motor comprises: a current detecting unit for detecting a current value to be supplied to the motor for driving the motor; a current control section for determining the current value to be supplied to the motor based on a motor rotational command fed from an external portion and controlling the current value to be supplied to the motor by judging whether the current value detected by said current detecting unit is of an overcurrent level exceeding a prescribed value or a normal level which is not greater than the prescribed value, wherein when the current value detected by the current detecting unit is of an overcurrent level, the current control section restrains the current value to be supplied to the motor irrespective of the external motor rotational command, and when the current value detected by the current detecting unit is of the normal level, the current value to be supplied to the motor is restored to an original non-restraint level.

According to a second aspect of the present invention, the current control section includes: a comparator unit comparing the current value detected by the current detecting unit with the prescribed value to generate a comparison result as a current command suppression instruction signal; and a current command generator receiving the comparison result and external motor rotational command to generate a current command based on the external motor rotational command and the comparison result, wherein when the comparator unit judges that the current value detected by the current detecting unit exceeds the prescribed value, the current command generator suppresses the current command based on the current command suppression instruction signal of the comparison result.

According to a third aspect of the present invention, the current suppression rate of the current command is varied in accordance with current excess steps of the overcurrent value exceeding the prescribed value.

According to a fourth aspect of the present invention, when the current value detected by the current detecting unit is judged to be equal to the normal level, the current value to be supplied to the motor is gradually restored to the original non-restraint level.

According to a fifth aspect of the present invention, the current command generator includes: a current detection timer for generating a timing signal indicating a cycle of detecting the current suppression instruction signal; a counter which receives the current suppression instruction signal detected every cycle of the timing signal generated by the current detection timer and counts the overcurrent detection times; and a current suppression timer for generating a timing signal indicative of a cycle of taking the counted number of the counter, whereby the suppression amount of the current command value is determined based on the counted value output of the counter.

According to a sixth aspect of the present invention, when the count value of the overcurrent detection times counted by the counter becomes zero, the current command value is gradually returned to the original non-restraint level.

According to a seventh aspect of the present invention, a maximum current suppression value is set in the current command value, and when the current command value becomes equal to or smaller than the maximum current suppression value, the current command value is set to zero.

According to an eighth aspect of the present invention, when the current command is kept suppressed with the suppression signal for a predetermined time period, the current command value is set to zero.

According to a ninth aspect of the present invention, when the current command is set to zero, the current supply to the motor is stopped and the stopped current supply is not restored until the current supply control apparatus is reset.

According to a tenth aspect of the present invention, the current detecting unit detects the current value flowing through a power device.

According to an eleventh aspect of the present invention, the current detecting unit detects the current value flowing through the motor.

According to a twelfth aspect of the present invention, the current control apparatus further comprises a short circuit protector monitoring the current value supplied to the motor, and when the current supply value is of a destructive level for a power device, the current supply to the motor is stopped.

With the construction described above, when the current flowing through the drive power device of the electric car exceeds the prescribed value, the current supply is restrained in this manner, and when the current is controlled to be equal to or lower than the prescribed value, the current supply state is restored to the normal operation state. Thus, it is possible to prevent each of the parts of the car from being damaged, and secure safety of the car against danger such as collision due to sudden control to stop. Moreover, a danger can be avoided even when overcurrent is generated, having a large tolerance to a noise caused when the current is detected, eliminating sudden variation in motor torque. Further, the motor control apparatus includes a mechanism to completely stop the current supply when the current exceeds the maximum restraining current, or when the current restraint is kept for a fixed time period, or when flowing an overcurrent which may destroy the power device. Therefore, it is possible to prevent a fire of a car from breaking out.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A current control apparatus with an overcurrent protective function for a motor comprising:
    a current detecting unit for detecting a current value to be supplied to the motor for driving the motor;
    a current control section for determining the current value to be supplied to the motor based on a motor rotational command fed from an external portion and controlling the current value to be supplied to the motor by judging whether the current value detected by said current detecting unit is of an overcurrent level exceeding a prescribed value or a normal level which is not greater than the prescribed value,
        wherein when the current value detected by said current detecting unit is of an overcurrent level, said current control section restrains the current value to be supplied to the motor irrespective of the external motor rotational command, and when the current value detected by said current detecting unit is of the normal level, the current value to be supplied to the motor is restored to an original non-restraint level.

2. The current control apparatus as claimed in claim 1, wherein said current control section includes:
    a comparator unit comparing the current value detected by said current detecting unit with the prescribed value to generate a comparison result as a current command suppression instruction signal; and
    a current command generator receiving the comparison result and external motor rotational command to generate a current command based on the external motor rotational command and the comparison result,
        wherein when said comparator unit judges that the current value detected by said current detecting unit exceeds the prescribed value, the current command generator suppresses the current command based on the current command suppression instruction signal of the comparison result.

3. The current control apparatus as claimed in claim 2, wherein the current suppression rate of the current command is varied in accordance with current excess steps of the overcurrent value exceeding the prescribed value.

4. The current control apparatus as claimed in claim 1, wherein when the current value detected by said current detecting unit is judged to be equal to the normal level, the current value to be supplied to the motor is gradually restored to the original non-restraint level.

5. The current control apparatus as claimed in claim 2, wherein said current command generator includes:
    a current detection timer for generating a timing signal indicating a cycle of detecting the current suppression instruction signal;
    a counter which receives the current suppression instruction signal detected every cycle of the timing signal generated by the current detection timer and counts the overcurrent detection times; and
    a current suppression timer for generating a timing signal indicative of a cycle of taking the counted number of the counter,
        whereby the suppression amount of the current command value is determined based on the counted value output of the counter.

6. The current control apparatus as claimed in claim 5, wherein when the count value of the overcurrent detection times counted by the counter becomes zero, the current command value is gradually returned to the original non-restraint level.

7. The current control apparatus as claimed in claim 2, wherein a maximum current suppression value is set in the current command value, and when the current command value becomes equal to or smaller than the maximum current suppression value, the current command value is set to zero.

8. The current control apparatus as claimed in claim 3, wherein a maximum current suppression value is set in the current command value, and when the current command value becomes equal to or smaller than the maximum current suppression value, the current command value is set to zero.

9. The current control apparatus as claimed in claim 4, wherein a maximum current suppression value is set in the current command value, and when the current command value becomes equal to or smaller than the maximum current suppression value, the current command value is set to zero.

10. The current control apparatus as claimed in claim 2, wherein when the current command is kept suppressed with the suppression signal for a predetermined time period, the current command value is set to zero.

11. The current control apparatus as claimed in claim 3, wherein when the current command is kept suppressed with the suppression signal for a predetermined time period, the current command value is set to zero.

12. The current control apparatus as claimed in claim 4, wherein when the current command is kept suppressed with the suppression signal for a predetermined time period, the current command value is set to zero.

13. The current control apparatus as claimed in claim 2, wherein when the current command is set to zero, the current supply to the motor is stopped and the stopped current supply is not restored until the current supply control apparatus is reset.

14. The current control apparatus as claimed in claim 3, wherein when the current command is set to zero, the current supply to the motor is stopped and the stopped current supply is not restored until the current supply control apparatus is reset.

15. The current control apparatus as claimed in claim 4, wherein when the current command is set to zero, the current supply to the motor is stopped and the stopped current supply is not restored until the current supply control apparatus is reset.

16. The current control apparatus as claimed in claim 1, wherein said current detecting unit detects the current value flowing through a power device.

17. The current control apparatus as claimed in claim 2, wherein said current detecting unit detects the current value flowing through a power device.

18. The current control apparatus as claimed in claim 1, wherein said current detecting unit detects the current value flowing through the motor.

19. The current control apparatus as claimed in claim 2, wherein said current detecting unit detects the current value flowing through the motor.

20. The current control apparatus as claimed in claim 1 further comprising a short circuit protector monitoring the current value supplied to the motor, and when the current supply value is of a destructive level for a power device, the current supply to the motor is stopped.

21. The current control apparatus as claimed in claim 2 further comprising a short circuit protector monitoring the current value supplied to the motor, and when the current supply value is of a destructive level for a power device, the current supply to the motor is stopped.

22. An electric vehicle using a current control apparatus with an overcurrent protective function for a motor, the current supply control apparatus comprising:
   a current detecting unit for detecting a current value to be supplied to the motor for driving the motor;
   a current control section for determining the current value to be supplied to the motor based on a motor rotational command fed from an external portion and controlling the current value to be supplied to the motor by judging whether the current value detected by said current detecting unit is of an overcurrent level exceeding a prescribed value or a normal level which is not greater than the prescribed value,
      wherein when the current value detected by said current detecting unit is of an overcurrent level, said current control section restrains the current value to be supplied to the motor irrespective of the external motor rotational command, and when the current value detected by said current detecting unit is of the normal level, the current value to be supplied to the motor is restored to an original non-restraint level.

* * * * *